(12) United States Patent
Rebolledo

(10) Patent No.: US 7,484,706 B2
(45) Date of Patent: Feb. 3, 2009

(54) TUB SUSPENSION ASSEMBLIES

(75) Inventor: Victor Rebolledo, Aguascalientes (MX)

(73) Assignee: Pimmler Holdings Inc., Monticello, IN (US)

( * ) Notice: Subject to any disclaimer, the term of this patent is extended or adjusted under 35 U.S.C. 154(b) by 373 days.

(21) Appl. No.: 10/572,805

(22) PCT Filed: Oct. 6, 2004

(86) PCT No.: PCT/US2004/032894

§ 371 (c)(1),
(2), (4) Date: Mar. 22, 2006

(87) PCT Pub. No.: WO2005/036045

PCT Pub. Date: Apr. 21, 2005

(65) Prior Publication Data

US 2006/0231725 A1  Oct. 19, 2006

Related U.S. Application Data

(60) Provisional application No. 60/509,128, filed on Oct. 6, 2003.

(51) Int. Cl.
*F16M 1/00* (2006.01)
(52) U.S. Cl. .................... 248/610; 248/611; 248/638
(58) Field of Classification Search ............... 248/638, 248/639, 610, 611, 617, 562, 578, 580, 581, 248/583, 589, 590, 605, 606; 68/23.1, 23.3; 267/71
See application file for complete search history.

(56) References Cited

U.S. PATENT DOCUMENTS

| | | | | | |
|---|---|---|---|---|---|
| 2,296,261 | A | * | 9/1942 | Breckenridge et al. | 68/23.1 |
| 2,613,837 | A | * | 10/1952 | Morton | 206/320 |
| 3,744,746 | A | * | 7/1973 | Weir et al. | 248/569 |
| 4,007,612 | A | * | 2/1977 | Brimer | 68/23.2 |
| 4,475,363 | A | * | 10/1984 | Thomson | 68/23.3 |
| 4,625,529 | A | * | 12/1986 | Anderson | 68/23.3 |
| 5,000,015 | A | * | 3/1991 | Nakamura et al. | 68/23.3 |
| 5,117,659 | A | * | 6/1992 | Sharp et al. | 68/23.3 |
| 5,528,913 | A | * | 6/1996 | Savkar | 68/23.3 |
| 5,561,990 | A | * | 10/1996 | Berkcan et al. | 68/12.06 |
| 5,884,891 | A | * | 3/1999 | Hawkins et al. | 248/613 |
| 6,557,383 | B1 | | 5/2003 | Ito et al. | |
| 6,577,383 | B1 | | 6/2003 | Mahner | |
| 2003/0183994 | A1 | | 10/2003 | Atwater | |
| 2004/0103695 | A1 | * | 6/2004 | Lim | 68/12.16 |

\* cited by examiner

*Primary Examiner*—Korie Chan
(74) *Attorney, Agent, or Firm*—Barnes & Thornburg LLP

(57) ABSTRACT

Apparatus for suspending a vibratory element from a support which is relatively stationary with respect to the vibratory element. The apparatus includes a first member having first and second ends. The first end of the first member is coupled to the support and the second end of the first member depends downwardly from the first end of the first member. A second member is coupled to the vibratory element for movement relative to the first member as the vibratory element moves. A tension spring has a first end and a second end. The first end of the tension spring is coupled to the first member and the second end of the tension spring is coupled to the second member.

18 Claims, 6 Drawing Sheets

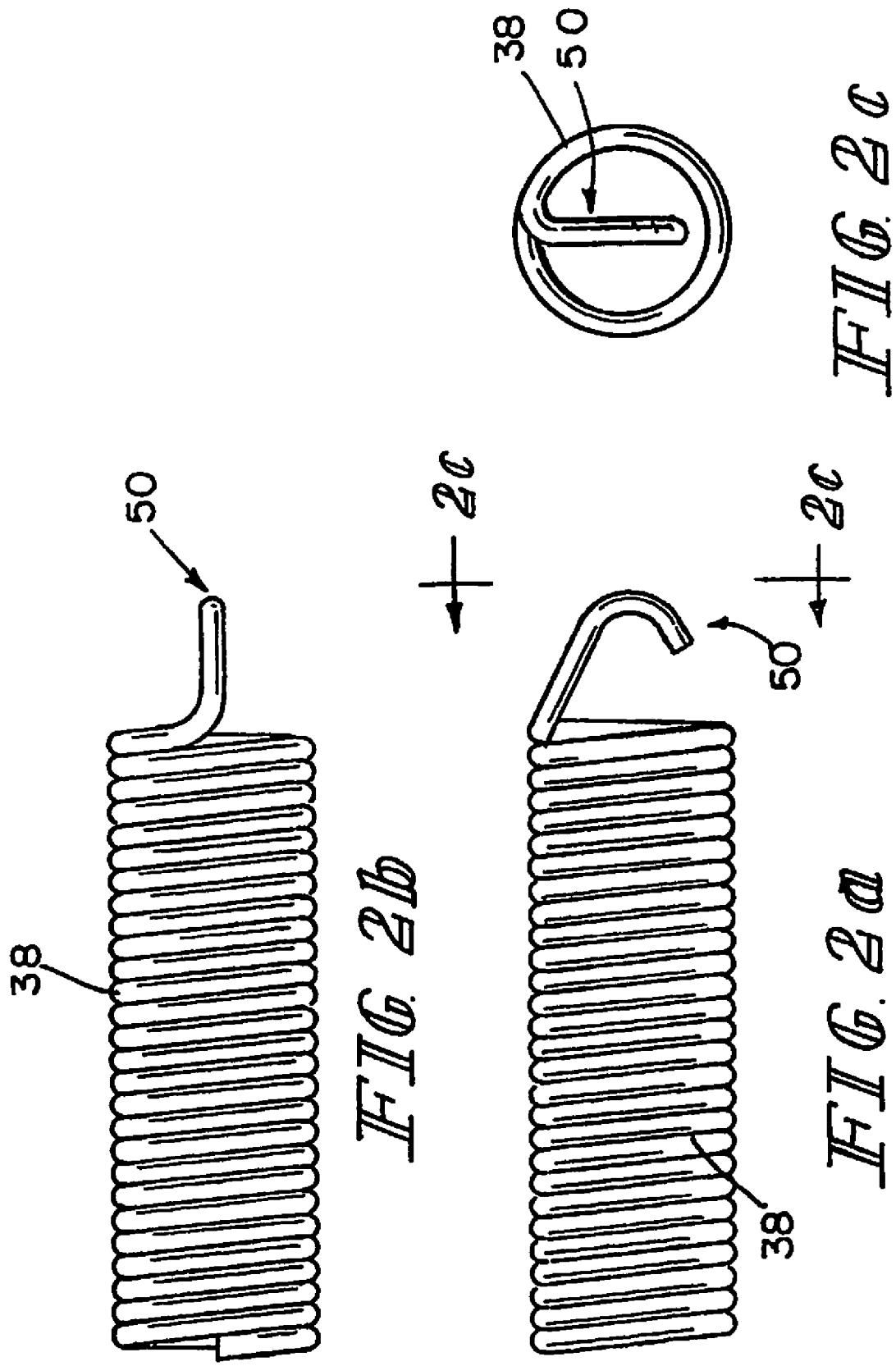

TUB SUSPENSION ASSEMBLIES

CROSS REFERENCE TO RELATED APPLICATIONS

This application is a U.S. national application under 37 C.F.R. § 371(b) of International Application Serial No. PCT/US2004/032894 filed Oct. 6, 2004, which claims the benefit, under 35 U.S.C. § 119(e), of U.S. Provisional Patent Application Ser. No. 60/509,128 filed Oct. 6, 2003, which is hereby incorporated herein by reference.

FIELD OF THE INVENTION

This invention relates to suspension apparatus. It is disclosed in the context of suspension assemblies for suspending, for example, a tub which rotates on an axis from a relatively stationary support frame. However, it is believed to be useful in other applications as well.

BACKGROUND OF THE INVENTION

A tub is supported by tub suspension assemblies. Material or articles to be treated (hereinafter sometimes a payload) is placed into the tub. The payload can be, for example, metal parts, plastic parts, clothes, or the like. Before, during or after loading of the payload, an agent may be introduced into the tub. The agent can be soap and water solution, paint, other organic solvent, sand, or any number of other well known cleaning or coating agents, or the like. After addition of the payload and the agent, where an agent is used, the tub typically is agitated for a time. After agitation, the payload and agent (again, where an agent is present) are removed and separated, in any convenient order. If the agent is a liquid, typically the agent is drained from the tub, typically by timed opening and closing of a system of drain valves or the like. In such circumstances, after drainage of the agent, the tub may be set into rotation to "spin dry" the payload in the tub to a damp condition as the spun out agent is drained. The payload typically is then removed for further processing.

The tub may also be the tub of a dryer in which the payload is subjected to drying, for example, by air provided by a fan and heated by, for example, a gas or electric heater and circulated through the tub contents. Tubs of this general description can be used in, for example, household washing and drying machines, industrial washing and drying machines, laboratory painting devices, industrial painting machines, tumbling cleaning and deburring machines, and so on.

The tub may be oriented with its axis of rotation extending vertically, horizontally, or at angles to vertical and horizontal. The tub may or may not be provided with internal agitating ribs. In use, the payload, which again can be metal parts, plastic parts, clothes, or the like, is placed into the tub and the agent (where one is used) is added. If the tub is provided with ribs, when the tub is set in motion, the ribs agitate the payload and agent (where one is used). The motion of the tub and its contents introduces vibrations which are coupled to components attached to the tub.

DISCLOSURE OF THE INVENTION

According to the invention, apparatus is provided for suspending a vibratory element from a support which is relatively stationary with respect to the vibratory element. The apparatus includes a first member having first and second ends. The first end of the first member is coupled to the support and the second end of the first member depends downwardly from the first end of the first member. A second member is coupled to the vibratory element for movement relative to the first member as the vibratory element moves. A tension spring has a first end and a second end. The first end of the tension spring is coupled to the first member and the second end of the tension spring is coupled to the second member.

Illustratively, the first member comprises a rod including an attachment point, the first end of the tension spring received at the attachment point.

Further illustratively, the attachment point comprises a passageway through first member, the tension spring including an end configured for engagement in the passageway.

Illustratively, the vibratory element comprises a tub for processing a payload, a drive for rotating the tub about a rotary axis of the tub, and a support upon which the tub is mounted for rotation by the drive.

Further illustratively, the support includes an opening for receiving the second member to couple to the vibratory element for movement relative to the first member as the vibratory element moves.

Additionally illustratively, the second member comprises a passageway for receiving the first member.

Illustratively, the second member includes a bearing surface.

Additionally illustratively, the bearing surface comprises a surface of rotation of a plane curve.

Further illustratively, the bearing surface is part spherical.

Illustratively, the tension spring comprises a helical coil spring and the second member comprises a threaded portion, the threads of which are sized to threadedly engage coils of the tension spring to couple the tension spring to the second member.

Further illustratively, the apparatus comprises a dampening element coupled to the first member between the second member and the second end of first member.

Illustratively, the first end of the tension spring is coupled to the first member between the second member and the first end of the first member.

Additionally illustratively, the dampening element comprises a compression spring.

Additionally or alternatively illustratively, the dampening element comprises damper constructed from an elastomeric material.

Illustratively, the dampening element comprises a fluid damper.

Illustratively, the support includes an opening for receiving the second member to couple to the vibratory element for movement relative to the first member as the vibratory element moves. The second member includes a first end relatively closer to the first end of the first member and a second end relatively closer to the second end of the first member. The second member further comprises a passageway for receiving the first member, a bearing surface, and a slot extending longitudinally of the first member from the second end of the second member toward the first end of the second member and intersecting the passageway. The second member is sufficiently resilient that the region of the second member including the slot flexes as the vibratory element moves against the bearing surface to vary the frictional engagement of the sidewall of the passageway against the first member.

Further illustratively, the second member includes two slots opposed across the passageway.

Additionally illustratively, the first bearing surface is complimentarily configured to an adjacent second bearing surface of the vibratory element.

Illustratively, the support includes an opening for receiving the second member to permit bearing engagement of the first and second bearing surfaces.

BRIEF DESCRIPTION OF THE DRAWINGS

The invention may best be understood by referring to the following detailed description and accompanying drawings which illustrate the invention. In the drawings:

FIGS. 2a-c illustrate side and end elevational views of a detail of the assembly illustrated in FIGS. 1a-d, with the view of FIG. 2c taken generally along section lines 2c-2c of FIG. 2a; and, FIG. 3 illustrates a side elevational view of a detail of the assembly illustrated in FIG. 1.

DETAILED DESCRIPTIONS OF ILLUSTRATIVE EMBODIMENTS

Referring now to FIG. 1, a tub 20 is supported by tub suspension assemblies 22, only one of which is illustrated in each of FIGS. 1a-d. A payload is placed into tub 20. The payload can be, for example, metal parts, plastic parts, clothes, or the like. Before, during or after loading of the payload, an agent may be introduced into the tub 20. The agent can be soap and water solution, paint, other organic solvents, sand, or any number of other well known cleaning or coating agents, or the like. After addition of the payload and the agent, where an agent is used, tub 20 typically is agitated for a time. After agitation, the payload and agent (again, where an agent is present) are removed and separated, in any convenient order. If the agent is a liquid, typically the agent is drained from the tub 20, typically by timed opening and closing of a system of drain valves or the like. In such circumstances, after drainage of the agent, tub 20 typically is set into rotation to "spin dry" the payload in the tub 20 to a damp condition as the spun out agent is drained. The payload typically is then removed for further processing.

The tub 20 may also be the tub of a dryer in which the payload is subjected to drying, for example, by air provided by a fan and heated by, for example, a gas or electric heater and circulated through the tub 20 contents.

The suspension 22 of the present invention can be used in, for example, household washing and drying machines, industrial washing and drying machines, laboratory painting devices, industrial painting machines, tumbling cleaning and deburring machines, and so on.

Figure 1A:
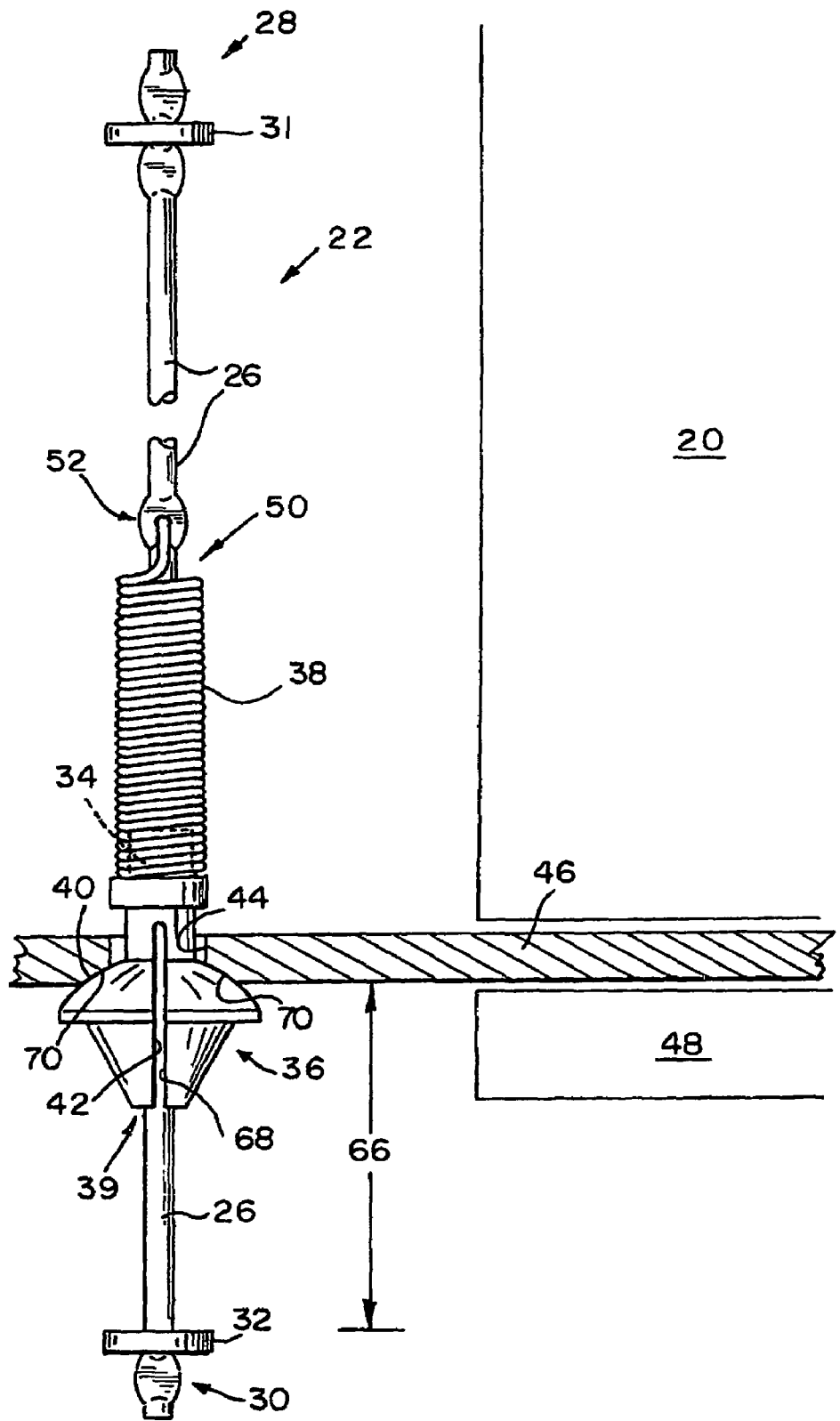
FIGS. 1a-d illustrate partly sectional side elevational views of assemblies constructed according to the invention.
Figure 1B:
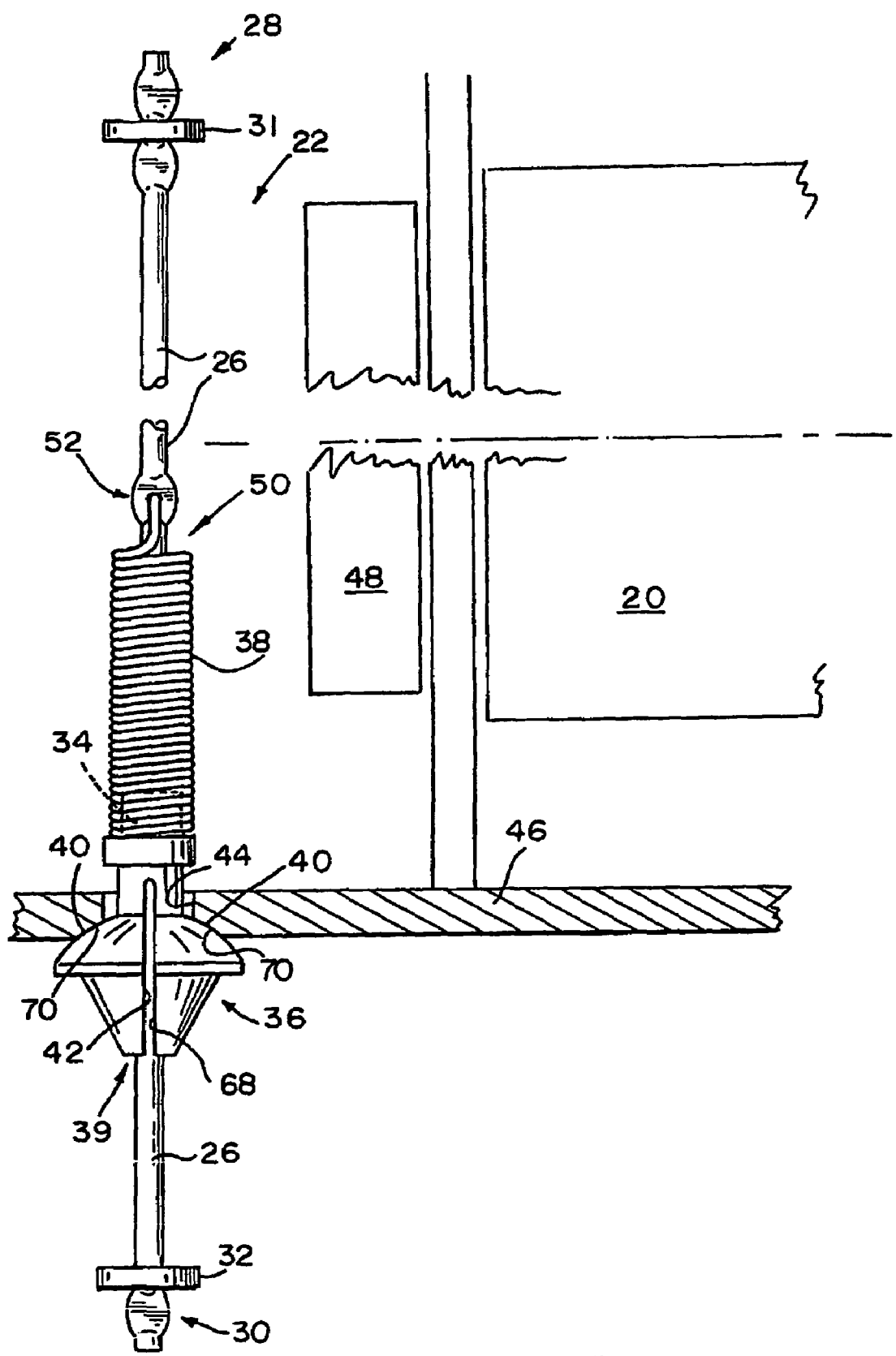
Figure 1C:
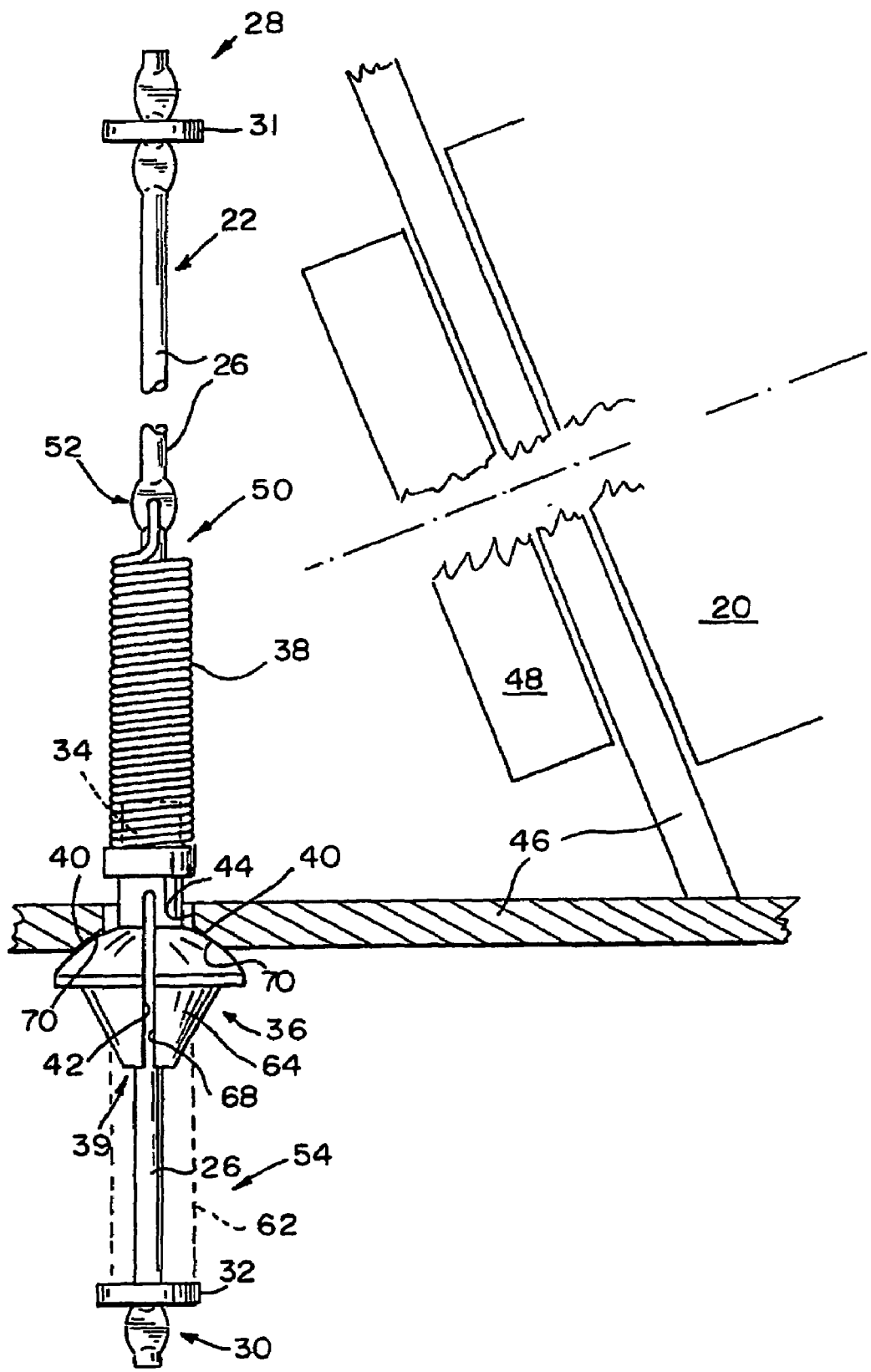
Figure 1D:
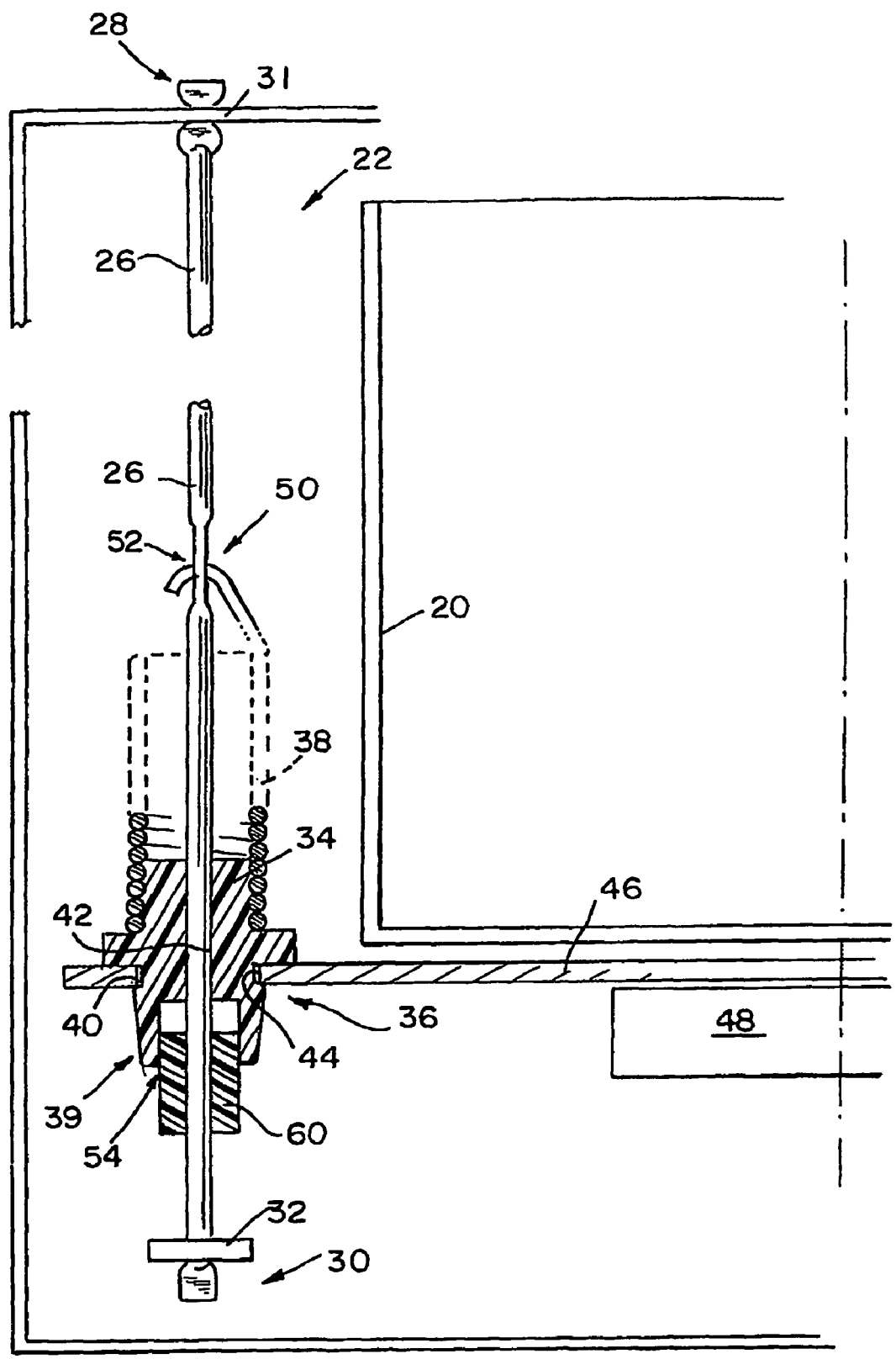
Figure 3:
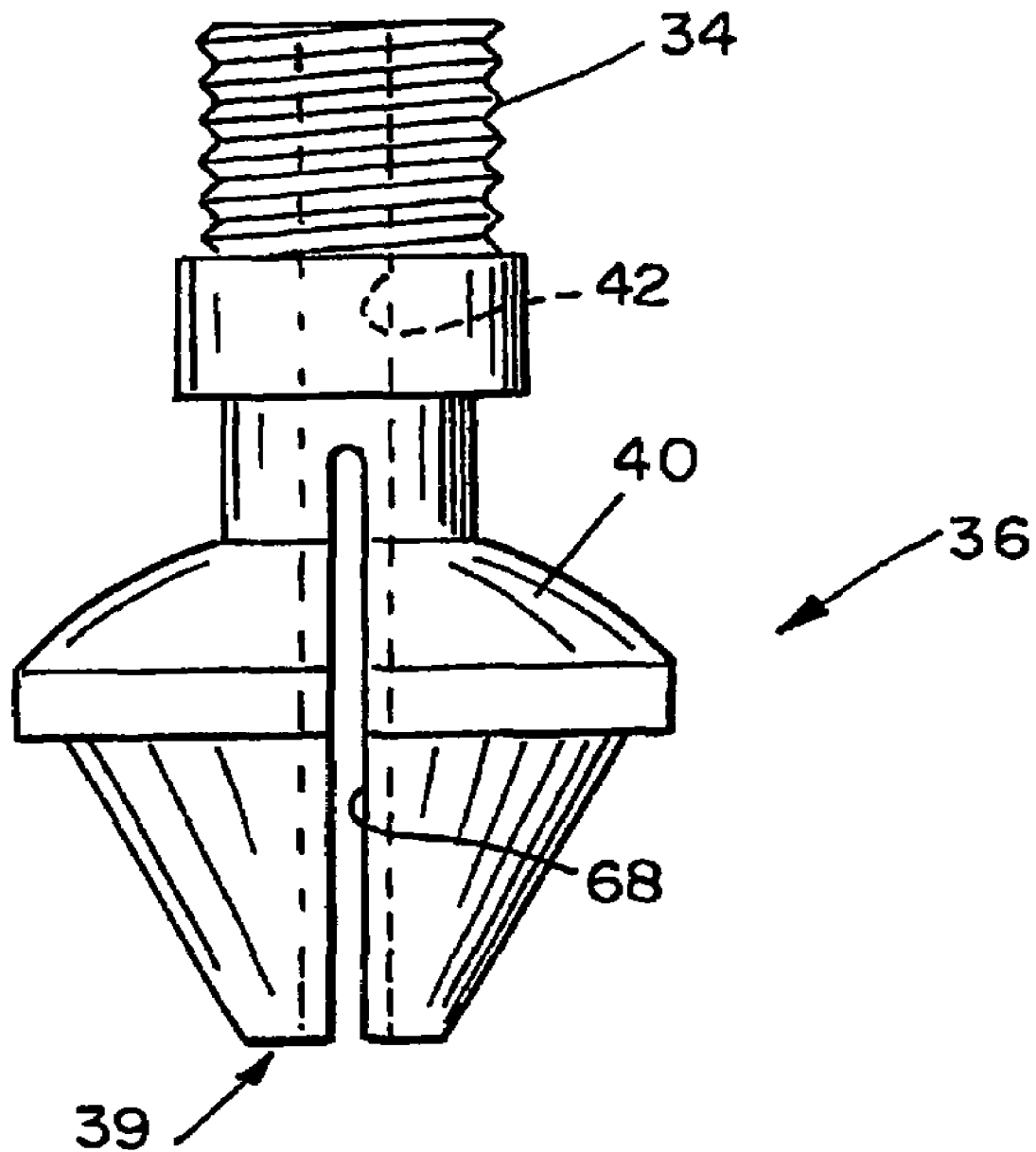

The suspension 22 of the present invention can be used in applications in which the tub 20 is oriented vertically, as illustrated in FIGS. 1a and 1d, or in which the tub is oriented horizontally, as illustrated in FIG. 1b, or in which the tub is oriented at angles to vertical and horizontal, as illustrated in FIG. 1c.

The tub 20 may or may not be provided with internal agitating ribs (not shown). In use, the payload, which again can be metal parts, plastic parts, clothes, or the like, is placed into the tub 20 and the agent (where one is used) is added. If the tub 20 is provided with ribs, when the tub 20 is set in motion, the ribs agitate the payload and agent (where one is used). The motion of the tub 20 and its contents introduces vibrations to the tub 20 which are coupled to components attached to the tub 20. These vibrations can be dampened by using tub suspension assemblies 22 constructed according to the present invention.

Each tub suspension assembly 22 includes a rod 26. Both ends 28, 30 of the rod 26 are enlarged, flattened, bent or provided with threaded fasteners or other means to mount the suspension assembly 22 and to capture other suspension assembly 22 components on the rod 26. End 28 of rod 26 is fastened at 31 to the machine frame. End 30 of rod 26 includes a stop 32, illustratively a washer captured by a flat or enlarged region of rod 26, a nut threaded onto end 30 of rod 26, or the like. One end 34 of a component 36 is threaded or otherwise configured to couple a tension spring 38, such as a helical coil spring, to component 36. Intermediate its ends 34 and 39, component 36 is formed to include a bearing surface 40, which can be shaped as a surface of rotation of a plane curve about an axis, illustratively, an axis of a passageway 42 which extends centrally through component 36. Illustratively, the spring 38 is a uniform diameter, helical coil spring. However, a variable diameter helical coil spring, for example, a barrel-shaped spring, an hourglass-shaped spring, or a stepped-diameter spring with varying amounts of initial tension, could be used. Illustratively, the surface 40 is part spherical.

Component 36 is sized to be received through a mounting passageway 44 in a structural member 46, typically a mounting plate, to which the tub 20 and its drive mechanism 48 are mounted. Spring 38 is coupled to component 36, illustratively by threading coils at one end of spring 38 over threads at end 34. The rod 26 is received through the central opening in spring 38 and the passageway 42 in component 36. The remaining end 50 of the spring 38 is coupled to the rod 26 at a location 52 intermediate the ends 28, 30 of rod 26. Illustratively, this can be accomplished by forming a flat on rod 26, providing a hole through rod 26 on the flat at location 52, and passing a hook at end 50 of spring 38 through the hole.

A dampening element 54, which may be, for example, a compression spring, a damper made out of rubber, plastic or other suitable material, a pneumatic damper, or a hydraulic damper, may be placed on rod 26 between component 36 and end 30. Dampening element 54 cooperates with component 36 to damp vibration of the tub 20/drive mechanism 48/structural member 46 assembly. Illustrative dampening elements include an elastomeric cylinder 60 including a passageway for receiving rod 26. Component 36 can be formed with a cylindrical depression on its underside for receiving dampening element 54, in the nature of a piston-and-cylinder type shock absorber (illustrated in FIG. 1d), to form an additional compressed air cushion for dampening vibration, or the elastomeric character of dampening element 54 can be relied upon to dampen the vibration.

Another illustrative dampening element is another spring 62 (illustrated in broken lines in FIG. 1c), such as, for example, a helical coil compression spring captured between stop 32 and a downwardly facing, somewhat frustoconically shaped spring seat 64 provided on component 36. Other types of dampening elements, such as elastomeric dampening elements, piston-and-cylinder type shock absorbers or the like, can be used in addition to, or instead of, the spring 62.

Another illustrative dampening element is illustrated in FIGS. 1a-c and 3. Component 36 has diametrically opposed, longitudinally extending slots 68 which extend upward from the lower end 39 of component 36 to the region where component 36 is received in passageway 44. The underside of member 46 is configured in the region 70 surrounding passageway 44 so that vibration of the components coupled to member 46 is coupled through the bearing engagement of surfaces 40, 70, causing component 36 to flex resiliently as promoted by slots 68. Region 70 can assume any number of shapes to promote this flexing. In FIGS. 1a-b, for example, region 70 is substantially part spherical with a radius of curvature substantially equal to that of surface 40. In FIG. 1c, region 70 is generally frustoconical in shape. Of course, numerous other shapes for surfaces 40, 70 are also available which achieve the end of causing flexing of the lower portion of component 36 to alter the frictional force between the sidewall of passageway 42 and rod 26 as vibrations are coupled to component 36.

The flexing of component 36 against rod 26 varies the frictional force of component 36 against the surface of rod 26, damping the motion of component 36 and the tub 20/drive mechanism 48/structural member 46 assembly supported on surface 40. Spring 38 keeps surfaces 40, 70 substantially constantly in bearing contact so that any motion of the tub 20/drive mechanism 48/structural member 46 assembly affects the force of the inside surface of passageway 42 against the sidewall of rod 26. Component 36 illustratively is constructed from filled or unfilled acetal resin. Other materials or material combinations and fillers or filler combinations are also useful to tailor the resiliency of component 36 and the frictional characteristics of the sidewall of its passageway 42 to the needs of a particular application.

When the tub 20 is filled, the distance 66 becomes smaller. In case of unbalance, distance 66 may become such that dampening element 54 bottoms out on stop 32. Dampening element 54 may be chosen from a number of designs and elastomeric materials, such as illustrated in FIG. 1d, so that it softens any such impact.

Changing of the spring constants, the load deflection rates, and the like, of the tub suspension assemblies 22 can be achieved in any of a number of ways in the illustrated embodiments. Dampening element 54 can be a specially designed compression spring 62 with one, or multiple, spring constants. The spring constants of the tension spring 38 and dampening element 54, may be judiciously chosen so that the appropriate vibration damping characteristics of the tub 20/drive mechanism 48/structural member 46 assembly are achieved.

Use of tension spring 38 simplifies the design and permits a reduction in components. The use of tension spring 38 tub suspension assemblies 22 permits the elimination of compressed air dampers often found in prior art assemblies. A good dynamic balance normally will require relatively low spring rates. Such spring rates can be achieved with tension springs 38. The inventive configuration also permits customization of the tub suspension assemblies 22 to the needs of a particular application, while requiring an inventory of relatively few different spring constants for the tension spring 38 and dampening element 54.

Dampening at impact of dampening element 54 against stop 32 can be controlled, for example, by selecting a different softness of the dampening element 54.

As previously noted, dampening element 54 can be a specially designed compression spring. Also as previously noted, when dampening element 54 is working in combination with tension spring 38, the deflection rate of the system can be made non-linear.

The invention claimed is:

1. Apparatus for suspending a vibratory element from a support which is relatively stationary with respect to the vibratory element, the apparatus including a first member having first and second ends, the first end of the first member adapted to couple to the support and the second end of the first member depending downwardly from the first end of the first member, a second member adapted to couple to the vibratory element for movement relative to the first member as the vibratory element moves, and a tension spring having a first end and a second end, the first end of the tension spring coupled to the first member and the second end of the tension spring coupled to the second member, the first member comprising a rod including an attachment point, the first end of the tension spring received at the attachment point, wherein the attachment point comprises a passageway through first member, the tension spring including an end configured for engagement in the passageway.

2. Apparatus for suspending a vibratory element from a support which is relatively stationary with respect to the vibratory element, the apparatus including a first member having first and second ends, the first end of the first member adapted to couple to the support and the second end of the first member depending downwardly from the first end of the first member, a second member adapted to couple to the vibratory element for movement relative to the first member as the vibratory element moves, and a tension spring having a first end and a second end, the first end of the tension spring coupled to the first member and the second end of the tension spring coupled to the second member, wherein the vibratory element comprises a tub for processing a payload, a drive for rotating the tub about a rotary axis of the tub, and a support upon which the tub is mounted for rotation by the drive.

3. The apparatus of claim 2 wherein the support includes an opening for receiving the second member to couple to the vibratory element for movement relative to the first member as the vibratory element moves.

4. The apparatus of claim 3 wherein the second member comprises a passageway for receiving the first member.

5. The apparatus of claim 3 wherein the second member includes a bearing surface.

6. The apparatus of claim 5 wherein the bearing surface comprises a surface of rotation of a plane curve.

7. The apparatus of claim 6 wherein the bearing surface is part spherical.

8. The apparatus of claim 3 wherein the tension spring comprises a helical coil spring and the second member comprises a threaded portion, the threads of which are sized to threadedly engage coils of the tension spring to couple the tension spring to the second member.

9. Apparatus for suspending a vibratory element from a support which is relatively stationary with respect to the vibratory element, the apparatus including a first member having first and second ends, the first end of the first member adapted to couple to the support and the second end of the first member depending downwardly from the first end of the first member, a second member adapted to couple to the vibratory element for movement relative to the first member as the vibratory element moves, a tension spring having a first end and a second end, the first end of the tension spring coupled to the first member and the second end of the tension spring coupled to the second member, and a dampening element coupled to the first member between the second member and the second end of the first member.

10. The apparatus of claim 9 wherein the first end of the tension spring is coupled to the first member between the second member and the first end of the first member.

11. The apparatus of claim 10 wherein the dampening element comprises a damper constructed from an elastomeric material.

12. The apparatus of claim 10 wherein the dampening element comprises a fluid damper.

13. Apparatus for suspending a vibratory element from a support which is relatively stationary with respect to the vibratory element, the apparatus including a first member having first and second ends, the first end of the first member adapted to couple to the support and the second end of the first member depending downwardly from the first end of the first member, a second member adapted to couple to the vibratory element for movement relative to the first member as the vibratory element moves, and a tension spring having a first end and a second end, the first end of the tension spring coupled to the first member and the second end of the tension spring coupled to the second member, wherein the second member comprises a dampening element for exerting a force on the first member as the vibratory element moves.

14. The apparatus of claim 13 wherein the support includes an opening for receiving the second member to couple to the vibratory element for movement relative to the first member as the vibratory element moves, the second member includes a first end relatively closer to the first end of the first member and a second end relatively closer to the second end of the first member, the second member further comprises a passageway for receiving the first member, a bearing surface, and a slot extending longitudinally of the first member from the second end of the second member toward the first end of the second member and intersecting the passageway, the second member being resilient so that the region of the second member including the slot flexes as the vibratory element moves against the bearing surface to vary the frictional engagement of the sidewall of the passageway against the first member.

15. The apparatus of claim 14 wherein the second member includes two slots opposed across the passageway.

16. The apparatus of claim 14 wherein the first bearing surface is complementarily configured to an adjacent second bearing surface of the vibratory element.

17. The apparatus of claim 16 wherein the support includes an opening for receiving the second member to permit bearing engagement of the first and second bearing surfaces.

18. The apparatus of claim 14 wherein the first member comprises a rod.

* * * * *